United States Patent [19]

Mueller

[11] Patent Number: 5,532,053
[45] Date of Patent: Jul. 2, 1996

[54] HIGH MOISTURE TRANSMISSION MEDICAL FILM

[75] Inventor: Walter B. Mueller, Inman, S.C.

[73] Assignee: W. R. Grace & Co.-Conn., Duncan, S.C.

[21] Appl. No.: 203,540

[22] Filed: Mar. 1, 1994

[51] Int. Cl.⁶ .................. B32B 27/02; B32B 27/08; B32B 27/36; C08G 63/668
[52] U.S. Cl. .................. 428/287; 428/349; 428/475.2; 428/476.3; 428/483; 428/516; 525/173; 525/176; 525/178; 525/425; 525/437; 525/444; 528/272; 528/300; 528/301; 528/307; 528/308.6; 528/335
[58] Field of Search .................. 428/423.1, 423.7, 428/423.5, 289, 286, 290, 287, 518, 516, 483, 265, 267, 246, 252, 475.2, 480, 483, 476.3, 349; 604/304, 306, 307; 528/272, 300, 301, 307, 332, 335, 308.6; 525/173, 176, 178, 425, 437, 444

[56] References Cited

U.S. PATENT DOCUMENTS

| | | | |
|---|---|---|---|
| 4,256,861 | 3/1981 | Davis et al. | 525/437 |
| 4,349,469 | 9/1982 | Davis et al. | 524/765 |
| 4,493,870 | 1/1985 | Vrouenraet et al. | 428/245 |
| 4,685,455 | 8/1987 | Vrouenraet | 128/156 |
| 4,698,372 | 10/1987 | Moss | 521/145 |
| 4,725,481 | 2/1988 | Ostapchenko | 428/213 |
| 4,759,354 | 7/1988 | Quarfoot | 128/156 |
| 4,808,675 | 2/1989 | Twilley et al. | 525/408 |
| 4,847,142 | 7/1989 | Twilley et al. | 428/252 |
| 4,867,150 | 9/1989 | Gilbert | 128/155 |
| 4,897,274 | 1/1990 | Candida et al. | 426/127 |
| 4,908,260 | 3/1990 | Dodia et al. | 428/215 |
| 4,925,732 | 5/1990 | Driskill et al. | 428/336 |
| 4,938,752 | 7/1990 | Vrouenraets et al. | 604/370 |
| 4,968,464 | 11/1990 | Kojoh et al. | 264/41 |
| 5,035,687 | 7/1991 | Sandbank | 604/180 |
| 5,169,712 | 12/1992 | Tapp | 428/315 |
| 5,219,325 | 6/1993 | Hennink et al. | 602/41 |

FOREIGN PATENT DOCUMENTS

| | | |
|---|---|---|
| 0199871 | 11/1986 | European Pat. Off. . |
| 0398611A1 | 11/1990 | European Pat. Off. . |
| WO89/08556 | 9/1989 | WIPO . |

OTHER PUBLICATIONS

GB Abstract Sep. 10, 1993 Anonymous.

*Primary Examiner*—Paul Thibodeau
*Assistant Examiner*—Vivian Chen
*Attorney, Agent, or Firm*—Thomas C. Lagaly

[57] ABSTRACT

The present invention relates to a laminate film useful as a material from which to manufacture surgical and other protective garments. The laminate film comprises at least one layer formed from a first polyetherester copolymer produced from the condensation reaction of dimethyl-1,4-cyclo hexane dicarboxylate and 1,4-cyclo hexane dimethanol and poly(tetramethylene ether glycol) and a second layer comprising a material selected from the group consisting of an ethylene-vinyl acetate copolymer, an ethylene methacrylate copolymer, a second polyetherester copolymer, an anhydride modified polyolefin copolymer, and a polyether block amide copolymer. The total amount of the first polyetherester copolymer present in the laminate is greater than or equal to 35 wt. % of the total weight of the laminate film to provide strength to the laminate film. The laminate film may be bonded to one or more layers of polyesters, polyolefins, polyamides, and non-woven fabrics.

10 Claims, No Drawings

HIGH MOISTURE TRANSMISSION MEDICAL FILM

BACKGROUND OF THE INVENTION

The present invention relates to a high moisture transmission laminate film having utility in medical applications, in particular as part of a laminate construction from which surgical and other protective garments can be manufactured.

In the medical field, there is great concern about the transmission of infectious agents and the need for protecting doctors and surgeons from these infectious agents during the treatment and examination of patients. Efforts have been made to develop surgical gowns and drapes which contain barriers against the transmission of infectious agents. One such effort is exemplified in published European Patent Application 0 398 611 to Woodcock. The invention described therein relates to a surgical or hygienic barrier artefact comprising a fabric operative to prevent the passage of infectious agents through it from one side of the fabric to the other. The artefact is made from a substrate and a non-porous coating of the type which transports water only in the vapor phase. The Woodcock invention is based upon the discovery that certain materials, which have the capacity to transmit water in the vapor phase as well as gases soluble therein, operate as effective barriers to viral agents. In the Woodcock invention, the coating may be a hydrophilic polyurethane, while the substrate may comprise a closely woven nylon, polyester, or other synthetic or natural fiber.

Similar concerns have given rise to the development of improved wound dressings. One such dressing is illustrated in U.S. Pat. No. 4,867,150 to Gilbert. The Gilbert wound dressing comprises a pad of absorbent gas-permeable fabric formed from fibers held in place by interlocking and frictional engagement with each other and an elastomeric, soft, substantially non-absorbent, foraminous thin polyurethane film attached thereto. In one embodiment of the Gilbert dressing, a combination of polyesters, nylon or rayon are thermally bonded to a Hytrel brand copolyester.

Other types of composite film material which have been suggested for use as a construction fabric for medical apparel or for other articles of clothing are set out in U.S. Pat. Nos. 4,925,732 to Driskill et al. and 5,169,712 to Tapp. The Driskill patent relates to a laminate that has particular utility in shoes. The laminate comprises flexible moisture permeable adherent layers bonded together by a moisture permeable or breathable adhesive. The Tapp patent describes a porous film composite comprising at least one layer of an oriented microporous film having microvoid cells and interconnecting pores between the cells.

There still remains a need for improved laminate materials that may be used for viral barrier surgical garments.

SUMMARY OF THE INVENTION

Accordingly, it is an object of the present invention to provide an improved high moisture transmission film.

It is a further object of the present invention to provide a film as above which may be laminated to non-woven materials for producing a laminate construction from which viral barrier surgical garments can be manufactured.

It is a further object of the present invention to provide an improved process for laminating the high moisture transmitting film as above to a non-woven material.

Still other objects of and advantages to the present invention will become more apparent from the following description.

The foregoing objects are achieved by the laminate film of the present invention and the process for forming a material suitable for use in the manufacture of surgical and other protective garments of the present invention.

In one embodiment, the laminate film of the present invention is characterized by first and second layers with the first layer comprising a polyetherester copolymer material produced from the condensation reaction of dimethyl −1,4-cyclo hexane dicarboxylate 1,4-cyclo hexane dimethanol and poly(tetramethylene ether glycol) and the second layer comprising a first material selected from the group consisting of an ethylene-vinyl acetate copolymer material, an ethylene methacrylate copolymer (EMA), an anhydride modified polyolefin copolymer material and a polyether block amide copolymer material. If desired, the second layer may further comprise a second material blended with the first material. The second material may be selected from the group consisting of a polyetherester copolymer material and a polyether block amide copolymer material.

In the laminate films of the present invention, the polyetherester copolymer material produced from the condensation reaction of dimethyl −1,4-cyclo hexane dicarboxylate 1,4-cyclo hexane dimethanol and poly(tetramethylene ether glycol) is present in an amount greater than or equal to about 35 wt. % with respect to the total weight of the laminate film so that the laminate film has excellent strength. Laminate films in accordance with the present invention have a moisture vapor transmission rate greater than or equal to about 750 grams/m$^2$ as determined by ASTM F1249.

The laminate films of the present invention may be formed by coextruding the layers. Alternatively the laminate film may be formed of layers at least one of which is a blend comprising the polyetherester copolymer material produced from the condensation reaction of dimethyl −1,4-cyclo hexane dicarboxylate 1,4-cyclo hexane dimethanol and poly(tetramethylene ether glycol) with at least one material selected from the group consisting of a polyether block amide copolymer material, an ethylene methacrylate copolymer material, an ethylene-vinyl acetate copolymer material, a polyolefin based material, an anhydride modified polyolefin based material, another polyetherester copolymer material, and mixtures thereof in a layer or layers and which layers are extruded through a coextrusion die.

Laminate films in accordance with the present invention have utility as part of a laminate construction for surgical garments and other protective garments. When used for this purpose, a laminate film in accordance with the present invention may be bonded to one or more layers of a non-woven material. To bond the laminate film to the non-woven material, the laminate film is first exposed to a corona treatment to improve the adhesion properties of two opposed longitudinally extending surfaces. The non-woven material to be laminated to the laminate film is also exposed to a corona treatment along one of its longitudinally extending surfaces to improve the adhesion properties of that surface. The laminate film and the non-woven material are then bonded together by passing the laminate film and the non-woven material through a nip formed by two rolls. Typically, the rolls will each be heated to a temperature in the range of from about 150° F. to about 300° F.

Other details of the laminate film of the present invention and the process for joining the laminate film to the non-woven material are set out in the following detailed description.

DETAILED DESCRIPTION OF THE PREFERRED EMBODIMENT(S)

As previously discussed, the present invention relates to a laminate film which has use in medical applications such as part of a laminate construction from which surgical and other protective garments can be manufactured. In a first embodiment, the laminate film of the present invention has a multi-layer construction. For example, the laminate film may have first and second layers with the first layer being formed from a polyetherester copolymer material produced from the condensation reaction of dimethyl −1,4-cyclo hexane dicarboxylate 1,4-cyclo hexane dimethanol and poly-(tetramethylene ether glycol) and the second layer having a first material selected from the group consisting of a polyether block amide copolymer material such as a PEBAX-brand copolymer material manufactured by Atochem, an ethylene-vinyl acetate copolymer material, an ethylene methacrylate copolymer material, a polyolefin based material, and an anhydride modified polyolefin based material. A PEBAX type of material is a polyether block amide copolymer with the polyamide being either PA6 or PA12 and the polyether being polyethylene glycol or polytetramethylene ether glycol.

A suitable polyetherester copolymer material which can be used for the first layer is an ECDEL-brand material manufactured by Eastman Chemical Product Inc. ECDEL copolyesters are produced from dimethyl −1,4-cyclohexanedicarboxylate, 1,4-cyclohexanedimethanol, and poly(tetramethylene ether glycol). An ECDEL-brand material is preferred because it has been found to add significant strength to the laminate film of the present invention. It is desirable from a strength standpoint for the polyetherester copolymer material to be present in the laminate film in an amount greater than or equal to about 35 wt. % with respect to the total weight of the laminate film.

If desired, the second layer may include a second material. The second material is preferably selected from the group consisting of a polyetherester copolymer material such as an ECDEL- or HYTREL-brand material and a polyether block amide copolymer material such as a PEBAX-brand material. A HYTREL type of material is a block copolymer of polybutylene terephthalate and polyether glycols with the polybutylene terephthalate being formed from dimethylterephthalate and 1,4-butane diol. Preferably, the first material and the second material are blended together. For example, the second layer may be a blend of an ethylene-maleic anhydride modified polyolefin copolymer material and ECDEL.

Still further, the laminate films of the present invention may include one or more additional layers. For example, the laminate film may have a third layer formed from a blend of an ethylene-maleic anhydride modified polyolefin copolymer material and ECDEL. In such a film, the first layer may be formed from a polyetherester copolymer material such as ECDEL and may be positioned between this third layer and the second layer. Still further, the second layer may be formed form the same materials as the third layer.

In an alternative construction, the second and third layers of the laminate film may be blends of an ethylene-maleic anhydride modified polyolefin copolymer material and a polyether block amide copolymer material such as a PEBAX material. In such a laminate film, it is preferred to form the first layer from an ECDEL-brand material.

In yet another embodiment of the present invention, the laminate film may have a five layer construction in which a core layer is formed from a PEBAX-brand material or a HYTREL-brand material, two intermediate layers formed from an ECDEL-brand material, and two external layers formed from a blend of an ethylene-maleic anhydride modified polyolefin copolymer material and an ECDEL-brand material. In this embodiment, each of the ECDEL intermediate layers is positioned between one of the external layers and the core layer. It is preferred in this embodiment that ECDEL-brand material be present in an amount greater than or equal to 35 wt. % of the total weight of the laminate film. Such films are extremely useful in that they have a moisture vapor transmission rate (MVTR) of 1500 grams/m$^2$.

Other laminate films which may be constructed in accordance with the teachings of the present invention are set out in the following chart:

| SEALANT LAYER | INTERNAL LAYER | CORE LAYER | INTERNAL LAYER | OPTIONAL SEALANT LAYER |
|---|---|---|---|---|
| PEBAX | ECDEL OR | ECDEL | SAME AS OTHER | SAME AS OTHER |
| 1074 1205 ETC EVA EMA ANHYDRIDE MODIFIED | BLENDS OF ECDEL WITH HYTREL OR PEBAX | PEBAX OR HYTREL OR BLENDS | INTERNAL LAYER | SEALANT LAYER |
| EMA EVA LDPE LLDPE BLENDS OF ABOVE WITH ECDEL PEBAX OR HYTREL | | | | |

In each of these laminate films, it is preferred that ECDEL be present in an amount greater than or equal to 35 wt. % of the total weight of the laminate film.

The laminate film of the present invention may have any desired thickness and any desired width. It is preferred however that the film have an overall thickness of about 1 mil or less, most preferably from about 0.6 mil to about 0.75 mil. Laminate films formed in accordance with the present invention have been found to have a moisture vapor transmission rate in excess of 750 grams/m$^2$ for a 24 hour period.

The laminate films of the present invention may be formed by coextruding the various layers. Any suitable coextrusion device known in the art may be used to manufacture the laminate film of the present invention. The overall width of the film will be a function of the coextrusion device being used. The following example illustrates one process for forming a laminate film in accordance with the present invention.

EXAMPLE I

A four layer laminate film having the following layers: (1) PEBAX 1205 SA; (2) BYNEL CXA E-361; (3) PEBAX 1205 SA; and (4) PEBAX MX 1657 was formed in the following manner. The PEBAX 1205 SA material forming layer (1) was extruded through a first extruder having a temperature of 400° F. in a first zone, a temperature of 450° F. in a second zone and a temperature of 425° F. in the adapter (the fixture connected to the inlet of the extrusion die). Extrusion of the layer took place through a coextrusion die, at a temperature of 400° F. The BYNEL CXA E-361 layer was coextruded about the first layer using a second extruder. The second extruder had a temperature of 375° F. in a first zone and a temperature of 400° F. in both a second zone and an adapter. The PEBAX 1205 SA layer (3) was coextruded about the BYNEL CXA E-361 (2) layer using a third extruder having a temperature of 400° F. in the first zone, a temperature of 450° F. in the second zone, and a temperature of 425° F. in the adapter. The PEBAX MX 1657 layer (4) was coextruded around the third layer using a fourth extruder having a temperature in the first zone of 400° F., a temperature in the second zone of 450° F., and a temperature in the adapter of 425° F. The laminate film which was produced had a gauge of 1 mil and a width of 23 inches. The extrusion rate or film speed used was 34 feet per minute.

EXAMPLE II

A four layer laminate film of (1) PEBAX MX 1074 SA, (2) BYNEL CXA E-361 , (3) PEBAX MX 1074 SA, and (4) PEBAX MX 1657 was formed using the conditions outlined in Example I by substituting PEBAX MX 1074 for the PEBAX 1205 SA in the first and third extruders. This film also had a film gauge of 1 mil and a width of 23 inches.

EXAMPLE III

The film of Example II was produced as above except at a film speed of 44 feet per minute. The resultant film had a gauge of 0.75 mil.

Other films which have been produced using the four extruder system described in Example I include: (1) a PEBAX MX 1657/ECDEL 9967/PEBAX MX 1657/PEBAX MX 1657 film having a 1 mil thickness and a twenty three and one-half inch width; (2) a HYTREL 8206/ECDEL 9967/HYTREL 8206/HYTREL 8206 film having a thickness of 1 mil and a film width of twenty two and one-half inch width; (3) a laminate film such as (2) above with a thickness of 0.75 mil; and (4) a PEBAX MX 1205 SA/ECDEL 9967/PEBAX MX 1205 SA/PEBAX MX 1657 film having a thickness of 1 mil and a width of 23 inches.

Still other laminate films which can be formed in accordance with the present invention include: a five layer laminate formed from PEBAX MX 1205/PEBAX MX 1657/ ECDEL 9967/PEBAX MX 1657/PEBAX MX 1205; a five layer laminate formed from PEBAX MX 1205/ECDEL 9967/ECDEL 9967/ECDEL 9967/PEBAX MX 1205; a five layer laminate formed from PEBAX MX 1205/a blend of 50% ECDEL 9967 and 50% PEBAX MX 1657/ECDEL 9967/a blend of 50% ECDEL 9967 and 50% PEBAX MX 1657/PEBAX MX 1205; and a five layer laminate film formed from Chevron EMA 2207/ECDEL 9967/PEBAX MX 1657 or HYTREL 8206/ECDEL 9967/Chevron EMA 2207. It should be apparent from the foregoing that the above mentioned materials can be combined in a number of different ways. The foregoing examples are not meant to be restrictive in any sense.

The thickness of the laminate film is determined at least in part by the moisture vapor transmission rate desired and the size of the bubble when extruding the film.

In an alternative embodiment of the present invention, a useful laminate film may be formed of one or more layers which in turn are made of a blend of plastic materials containing from about 10 to about 90% by weight, preferably about 50% by weight, of an ECDEL material and the balance being formed from one or more of the other plastic materials mentioned herein. The formulation of the blend may be varied as needed to form a film having a desired strength and a desired moisture vapor transmission rate. The ECDEL and plastic materials may be blended together using any suitable blender known in the art. The blended material may then be extruded through an extrusion die to form a laminate film with a desired thickness and width. It has been found that such blends are desirable in that the laminate films formed from them demonstrate an increased moisture vapor transmission rate.

When laminate films are to be used for surgical and other protective garments, it is desirable that they have a moisture vapor transmission rate in excess of 750 grams/m$^2$. Laminate films formed in accordance with the present invention were found to exceed the minimum required moisture vapor transmission of 750 grams/m$^2$. The following example illustrates the moisture vapor transmission rate obtainable with the films of the present invention.

EXAMPLE IV

A series of coextruded laminated films were prepared. This series of films included the following laminate films:

(1) a HYTREL 8206/ECDEL 9967/HYTREL 8206 film;

(2) a second HYTREL 8206/ECDEL 9967/HYTREL 8206 film;

(3) a PEBAX MX 1205/CXA E-361/PEBAX MX 1205/ PEBAX
MX1657 film;

(4) a PEBAX MX 1074/CXA E-361/PEBAX MX 1074/ PEBAX MX 1657 film;

(5) a second PEBAX MX 1074/CXA E-361/PEBAX MX 1074/PEBAX MX 1657 film;

(6) a PEBAX MX 1657/ECDEL 9967/PEBAX MX 1657 film; and (7) a PEBAX MX 1205/ECDEL 9967/PEBAX MX 1205/ PEBAX MX 1657 film.

A test in accordance with ASTM F1249 procedures was then conducted. Three samples of each of the above films had moisture applied over one surface and an air current passed over the opposite surface. The amount of moisture which was transmitted through the film was then measured.

The following table reports the moisture vapor transmission rate at 100° F. for the various samples that were tested.

TABLE 1

| SAMPLE | WATER VAPOR TRANSMISSION GRAMS/M² at 100% RH | GAUGE (MILS) |
| --- | --- | --- |
| 1 | 1717.4 | 1.30 |
|   | 1742.2 | 1.14 |
|   | 1643   | 1.34 |
| 2 | 2374.6 | 1.12 |
|   | 2325   | 1.10 |
|   | 2604   | 1.01 |
| 3 | 1264.8 | 1.26 |
|   | 1388.8 | 1.13 |
|   | 1866.2 | 1.23 |
| 4 | 2554.4 | 0.84 |
|   | 2411.8 | 0.89 |
|   | 2139   | 1.02 |
| 5 | 1748.4 | 1.10 |
|   | 1612   | 1.06 |
|   | 2132.8 | 1.01 |
| 6 | 2201   | 1.21 |
|   | 3031.8 | 0.92 |
|   | 2247.5 | 1.18 |
| 7 | 2287.8 | 1.02 |
|   | 2542   | 0.97 |
|   | 2294   | 1.01 |

This data indicates that films produced in accordance with the present invention well exceeded the required minimum moisture vapor transmission rate needed for surgical types of applications.

When used for surgical and other protective garments, the laminate films of the present invention will be laminated to a non-woven material, typically a polyamide based non-woven material such as Nylon, a polyester-based non-woven material or a polyolefin based non-woven material.

When the laminate film is to be bonded to a Nylon-based material, it is preferred that the laminate film layer to be joined to the Nylon-based material be formed from a PEBAX-brand material. When the non-woven material to be bonded is polyolefin based to the laminate films of the present invention, it is preferred that the laminate film layer to be bonded to the non-woven material be an ethylene-methacrylate (EMA) copolymer or other polyolefin based material.

Any technique known in the art may be used to laminate the film of the present invention to a chosen non-woven material. It has been found however that improved bond strength between the laminate film of the present invention and non-woven material can be obtained by corona treating both the laminate film and the non-woven material. The laminate film is treated along one or both opposed, longitudinally extending surfaces, depending on whether it will be bonded to one or two non-woven materials while the non-woven material is treated along one longitudinally extruding surface. Each one is individually passed through a corona treatment device having a grounded roll and an electrode spaced from the roll. The material being treated passes between the electrode and the roll. An electric arc is created to surface treat the material passing between the electrode and the roll. Typically, the electrical power used to create the arc is in the range of from about 3.0 to about 4.0 kilowatts. The corona treatment improves the adhesion properties of the surface(s) being treated. The amount of corona treatment which is applied depends upon the speed at which the material being treated passes through the gap between the electrode and the roll. Other means of corona treating may also be used.

After the corona treatment has been completed, a laminate construction suitable for use in the manufacture of surgical and other protective garments is prepared by laminating corona treated non-woven material to one or more surfaces of the corona treated laminate film. This is accomplished by passing the non-woven material and laminate film to be bonded together through a nip formed by two rolls. When the materials are passed through the nip, the corona treated surface of the non-woven material is placed in contact with a corona treated surface on the laminate film. A force of about 40 to 100 pounds per linear inch and any desired roll speed may be used to bond the materials together. If needed, the rolls may be heated to a temperature in the range of from about 150° F. to about 300° F.

It has been found that laminate films in accordance with the present invention when bonded to a non-woven material exhibit excellent MVTR properties. The following example illustrates this:

EXAMPLE V

A series of coextruded laminate films were prepared. The laminate films had the following constructions:

(1) EMA 2207/ECDEL 9967/EM 2207

(2) EMA 2207/ECDEL 9967/PEDAX MX 1074/ECDEL 9967/EMA 2207

(3) EMA 2207/ECDEL 9967/PEBAX MX 1657/ECDEL 9967/EMA 2207

(4) EMA 2207/ECDEL 9967/PEBAX MX 6031/ECDEL 9967/EMA 2207

(5) EMA 2207/ECDEL 9967/HYTREL 8206/ECDEL 9967/EMA 2207

(6) EMA 2207/ECDEL 9967/HYTREL 5556/ECDEL 9967/EMA 2207

(7) EMA 2207/ECDEL 9967/HYTREL 4069/ECDEL 9967/EMA 2207

(8) 50% EMA 2207/ECDEL 9967/ 50% EMA 2207 50% ECDEL 9965 50% ECDEL 9965

Three samples of each of the respective laminate films were then bonded to a non-woven material and subjected to the moisture vapor transmission rate test set out in Example IV. The results are set out in Table 2

TABLE 2

| SAMPLE | AVERAGE MVTR GRAMS/m² |
| --- | --- |
| 1 | 821.5 |
| 2 | 851.0 |
| 3 | 962.6 |
| 4 | 875.8 |
| 5 | 1015.3 |
| 6 | 903.6 |
| 7 | 922.3 |
| 8 | 1247.8 |

No sample showed an MVTR less than 806 grams/m² and results as high as 1302 grams/m² were achieved by the construction of sample no. 8.

It is apparent that there has been provided in accordance with this invention a high moisture transmission medical film which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A laminate film comprising: a first layer, a second layer, and a third layer; with the first layer comprising a first polyetherester copolymer produced from the condensation reaction of dimethyl-1,4-cyclo hexane dicarboxylate and 1,4-cyclo hexane dimethanol and poly(tetramethylene ether glycol);

the second layer comprising a material selected from the group consisting of an ethylene-vinyl acetate copolymer, an ethylene methacrylate copolymer, an anhydride modified polyolefin copolymer, and a polyether block amide copolymer; and the third layer comprising a blend of an ethylene methacrylate copolymer and a second polyetherester copolymer, wherein the second polyetherester copolymer is selected from the group consisting of: said first polyetherester copolymer; a block copolymer of polybutylene terephthalate and polyether glycols with the polybutylene terephthalate being formed from dimethyl terephthalate and 1,4-butane diol; and blends thereof; and wherein the total amount of said first polyetherester copolymer in the laminate film is greater than or equal to about 35 wt. % with respect to the total weight of the laminate film, and wherein said laminate film has a moisture vapor transmission rate greater than or equal to about 750 grams/m$^2$ per 24 hours.

2. The laminate film of claim 1 wherein said second layer further comprises a second material selected from the group consisting of a third polyetherester copolymer and a polyether block amide copolymer wherein the third polyetherester copolymer is selected from the group consisting of: said first polyetherester copolymer; a block copolymer of polybutylene terephthalate and polyether glycols with the polybutylene terephthalate being formed from dimethyl terephthalate and 1,4-butane diol; and blends thereof.

3. The laminate film of claim 2 wherein said second layer comprises a blend of an ethylene methacrylate copolymer and a fourth polyetherester copolymer wherein the fourth polyetherester copolymer is selected from the group consisting of: said first polyetherester copolymer; a block copolymer of polybutylene terephthalate and polyether glycols with the polybutylene terephthalate being formed from dimethyl terephthalate and 1,4-butane diol; and blends thereof.

4. The laminate film of claim 1 further comprising at least one additional layer formed from at least one material selected from the group consisting of an ethylene methacrylate copolymer, an anhydride modified polyolefin copolymer, a polyether block amide copolymer, a third polyetherester copolymer and blends thereof wherein the third polyetherester copolymer is selected from the group consisting of: said first polyetherester copolymer; a block copolymer of polybutylene terephthalate and polyether glycols with the polybutylene terephthalate being formed from dimethyl terephthalate and 1,4-butane diol; and blends thereof.

5. The laminate film of claim 1 wherein said first, second, and third layers are coextruded.

6. The laminate film of claim 1 further including a fourth layer adjacent said second layer, said fourth layer formed from a non-woven material.

7. A laminate film containing at least one layer comprising a first polyetherester copolymer produced from the condensation reaction of dimethyl-1,4-cyclo hexane dicarboxylate and 1,4-cyclo hexane dimethanol and poly(tetramethylene ether glycol) wherein the laminate film comprises:

a central core layer formed from a first material selected from the group consisting of a second polyetherester copolymer, a polyether block amide copolymer, and blends thereof;

two internal layers formed from a second material selected from the group consisting of a third polyetherester copolymer, a blend of a fourth polyetherester copolymer and a polyether block amide copolymer, and blends thereof; and at least one exterior sealant layer formed from a third material selected from the group consisting of a polyether block amide copolymer, an ethylene-vinyl acetate copolymer, an ethylene methacrylate copolymer, an anhydride modified ethylene-vinyl acetate copolymer, an anhydride modified low density polyethylene, and an anhydride modified linear low density polyethylene;

wherein said core layer is positioned between said internal layers and wherein said second, third, and fourth polyetherester copolymers are each selected from the group consisting of: said first polyetherester copolymer; a block copolymer of polybutylene terephthalate and polyether glycols with the polybutylene terephthalate being formed from dimethyl terephthalate and 1,4-butane diol; and blends thereof; and wherein the total amount of said first polyetherester copolymer in the laminate film is greater than or equal to about 35 wt. % with respect to the total weight of the laminate film.

8. The laminate film of claim 7 wherein said at least one exterior sealant layer further comprises a fourth material selected from the group consisting of a fifth polyetherester copolymer and a polyether block amide copolymer blended with said third material wherein the fifth polyetherester copolymer is selected from the group consisting of: said first polyetherester copolymer; a block copolymer of polybutylene terephthalate and polyether glycols with the polybutylene terephthalate being formed from dimethyl terephthalate and 1,4-butane diol; and blends thereof.

9. The laminate film of claim 7 wherein said laminate film has a moisture vapor transmission rate greater than or equal to about 750 grams/m$^2$ per 24 hours.

10. A laminate film comprising:

a first layer comprising a first polyetherester copolymer produced from the condensation reaction of dimethyl-1,4-cyclo hexane dicarboxylate and 1,4-cyclo hexane dimethanol and poly(tetramethylene ether glycol);

a second layer comprising a material selected from the group consisting of an ethylene-vinyl acetate copolymer, an ethylene methacrylate copolymer, an anhydride modified polyolefin copolymer, and a polyether block amide copolymer;

a third layer comprising a polyether block amide copolymer;

a fourth layer comprising a second polyetherester copolymer; and a fifth layer comprising a blend of an ethylene methacrylate copolymer and a third polyetherester copolymer;

wherein said third layer is located between said first and fourth layers and said second and fifth layers are external layers positioned adjacent said first and fourth layers; and wherein the second and third polyetherester copolymers are each selected from the group consisting of: said first polyetherester copolymer; a block copolymer of polybutylene terephthalate and polyether glycols with the polybutylene terephthalate being formed from dimethyl terephthalate and 1,4-butane diol; and blends thereof; and wherein the total amount of said first polyetherester copolymer in the laminate film is greater than or equal to about 35 wt. % with respect to the total weight of the laminate film, and wherein said laminate film has a moisture vapor transmission rate greater than or equal to about 750 grams/m$^2$ per 24 hours.

* * * * *